(12) United States Patent
Preuss

(10) Patent No.: US 10,697,230 B2
(45) Date of Patent: Jun. 30, 2020

(54) HIGH STRENGTH WINDOW OR DOOR SYSTEM

(71) Applicant: Taylor Made Group, LLC, Gloversville, NY (US)

(72) Inventor: Mark Preuss, Angola, IN (US)

(73) Assignee: TAYLOR MADE GROUP, LLC, Gloversville, NY (US)

(*) Notice: Subject to any disclaimer, the term of this patent is extended or adjusted under 35 U.S.C. 154(b) by 192 days.

(21) Appl. No.: 15/906,189

(22) Filed: Feb. 27, 2018

(65) Prior Publication Data
US 2019/0264493 A1 Aug. 29, 2019

(51) Int. Cl.
*E06B 3/54* (2006.01)
*B62D 33/06* (2006.01)

(52) U.S. Cl.
CPC ........ *E06B 3/5454* (2013.01); *B62D 33/0617* (2013.01)

(58) Field of Classification Search
CPC ................. E06B 3/5454; E06B 3/5436; E06B 2003/6255; B60J 1/16; B62D 33/0617
USPC ............ 52/716.5, 716.8, 204.5, 208, 204.53, 52/204.591, 204.597, 204.62, 204.63, 52/204.67, 204.68, 204.7, 204.71, 204.72
See application file for complete search history.

(56) References Cited

U.S. PATENT DOCUMENTS

| | | | | |
|---|---|---|---|---|
| 2,447,059 A * | 8/1948 | Eaton, Jr. | ............... | B64C 1/1476 244/121 |
| 2,479,036 A * | 8/1949 | Campbell | .......... | B62D 33/0621 296/102 |
| 2,997,333 A * | 8/1961 | Kauffman | ................ | B66C 13/54 296/190.11 |
| 3,894,333 A | 7/1975 | Chang | | |
| 4,204,374 A * | 5/1980 | Olson | ...................... | B32B 27/08 244/121 |
| 4,368,226 A | 1/1983 | Mucaria | | |
| 4,893,443 A * | 1/1990 | Haber | .................. | E06B 3/5436 52/204.593 |
| 4,933,227 A * | 6/1990 | Stewart | ............ | B32B 17/10018 156/102 |
| 5,315,952 A * | 5/1994 | Jackson, Jr. | ............ | B63C 11/49 114/177 |
| 5,529,366 A * | 6/1996 | Gold | ........................ | B60J 1/006 296/146.15 |
| 5,636,484 A | 6/1997 | DeBlock | | |
| 5,802,783 A | 9/1998 | Bayha | | |

(Continued)

FOREIGN PATENT DOCUMENTS

EP 1228950 A2 * 8/2002 ......... B62D 33/0621
WO WO 2017/140751 8/2017

*Primary Examiner* — Brent W Herring

(74) *Attorney, Agent, or Firm* — Nixon & Vanderhye P.C.

(57) ABSTRACT

A window or door system includes a window or door panel, a sidewall, and a frame bolted to the sidewall. In some arrangements, the frame is inverse U-shaped or O-shaped and includes a first channel for receiving the window or door panel. A trim member secured to the frame and extending across the U- or O-shape includes a second channel for receiving the window or door panel. A connector may extend through the trim member and the window or door panel across the second channel. The structure is configured to pass test requirements in ISO 8084, Machinery for Forestry—Operator Protective Structures.

14 Claims, 3 Drawing Sheets

(56) References Cited

U.S. PATENT DOCUMENTS

| | | | | |
|---|---|---|---|---|
| 6,134,851 A | * | 10/2000 | Roze | B60J 10/70 52/204.597 |
| 6,220,656 B1 | * | 4/2001 | Martin, Jr. | B60J 7/11 296/190.03 |
| 6,276,100 B1 | * | 8/2001 | Woll | B32B 17/10036 216/34 |
| 6,561,572 B1 | * | 5/2003 | Martin, Jr. | B62D 33/0621 296/190.1 |
| 7,152,806 B1 | | 12/2006 | Farrar et al. | |
| 7,758,104 B2 | | 7/2010 | Liebl et al. | |
| 7,793,581 B2 | | 9/2010 | Erskine | |
| 8,079,185 B2 | * | 12/2011 | Paspirgilis | B64C 1/1492 244/129.3 |
| 8,091,955 B2 | * | 1/2012 | Hill | B60J 1/16 296/146.16 |
| 8,429,865 B2 | * | 4/2013 | Nania | B60J 1/10 296/146.16 |
| 8,523,275 B2 | | 9/2013 | Jorgensen et al. | |
| 8,726,585 B2 | | 5/2014 | Sayer | |
| 8,789,324 B2 | | 7/2014 | Hay et al. | |
| 8,826,574 B2 | | 9/2014 | Eichner | |
| 8,826,597 B2 | * | 9/2014 | Raspic | B61D 19/023 244/129.3 |
| 9,073,620 B2 | * | 7/2015 | Kondo | B64C 1/1492 |
| 9,415,854 B2 | | 8/2016 | Yokoi | |
| 10,000,907 B2 | * | 6/2018 | Hill | B60K 28/10 |
| 2003/0159376 A1 | * | 8/2003 | Huynh | E04H 9/04 52/208 |
| 2010/0101404 A1 | | 4/2010 | Lorenzo et al. | |
| 2010/0264695 A1 | * | 10/2010 | Hill | B60J 1/00 296/190.11 |
| 2017/0074034 A1 | | 3/2017 | Lorenzo et al. | |
| 2017/0130516 A1 | * | 5/2017 | Hill | B60K 28/10 |

\* cited by examiner

HIGH STRENGTH WINDOW OR DOOR SYSTEM

CROSS-REFERENCES TO RELATED APPLICATIONS (Not Applicable)

STATEMENT REGARDING FEDERALLY SPONSORED RESEARCH OR DEVELOPMENT (Not Applicable)

BACKGROUND

The invention relates to a high strength window or door system and, more particularly, to a window or door system that is configured with enhanced connections and reinforcements to satisfy international standards for self-propelled forestry machines.

The International Organization for Standardization (ISO) (www.iso.org) is an independent, non-Governmental international organization that brings together experts to share knowledge and develop voluntary, consensus-based, market relevant international standards that support innovation and provide solutions to global challenges. Existing window or door systems for self-propelled vehicles typically are not robust enough to pass stringent ISO test requirements for certain machine applications. For example, test requirements stated in ISO 8084, Machinery for Forestry—Operator Protective Structures requires a window or door system that can withstand a 4000 lb. lateral force.

Typical window/door assemblies are connected with secure components to provide suitable protection for an operator in a less stringent environment, but existing window/door systems generally fall short of ISO requirements in a more demanding environment, such as forestry applications and/or where it is desirable or marketable to not have a protective safety side-screen in the cab, as it impairs visibility.

BRIEF SUMMARY

The window/door system of the described embodiments is configured to pass the test requirements stated in ISO 8084, Machinery for Forestry—Operator Protective Structures. ISO Standard 8084 is hereby incorporated by reference. The window/door system of the described embodiments is also applicable to other heavy equipment, UTV or other off-road vehicles that may need to satisfy similar standards.

In an exemplary embodiment, a window or door system includes a polycarbonate window or door panel, a sidewall, and a frame bolted to the sidewall. In some arrangements, the frame is inverse U-shaped or O-shaped and includes a first channel for receiving the window or door panel. A trim member secured to the frame and extending across the U- or O-shape includes a second channel for receiving the window or door panel. A connector may extend through the trim member and the window or door panel across the second channel.

The polycarbonate window or door panel may be coated with a hardening material. The connector may be formed of an inert material. The frame may be O-shaped, where the trim member includes a third channel that may be opposite facing relative to the second channel. The window or door panel may include a top panel secured between the first channel in the frame and the second channel in the trim member and a bottom panel secured between the third channel in the trim member and the first channel in the frame. In this context, the connector may include a first connector extending through the trim member and the top panel across the second channel and a second connector extending through the trim member and the bottom panel across the third channel.

The polycarbonate window or door panel may be coupled with glass. The polycarbonate window or door panel may have a thickness of ⅜". The system may be configured to pass test requirements in ISO 8084, Machinery for Forestry—Operator Protective Structures.

In another exemplary embodiment, a window or door system includes a window or door panel, a sidewall, a frame with a first channel secured to the sidewall, and a trim member secured to the frame and extending across the frame. The trim member may include a second channel for receiving the window or door panel, and the system is configured to pass test requirements in ISO 8084, Machinery for Forestry—Operator Protective Structures.

BRIEF DESCRIPTION OF THE DRAWINGS

These and other aspects and advantages will be described in detail with reference to the accompanying drawings, in which.

DETAILED DESCRIPTION

Figure 1:
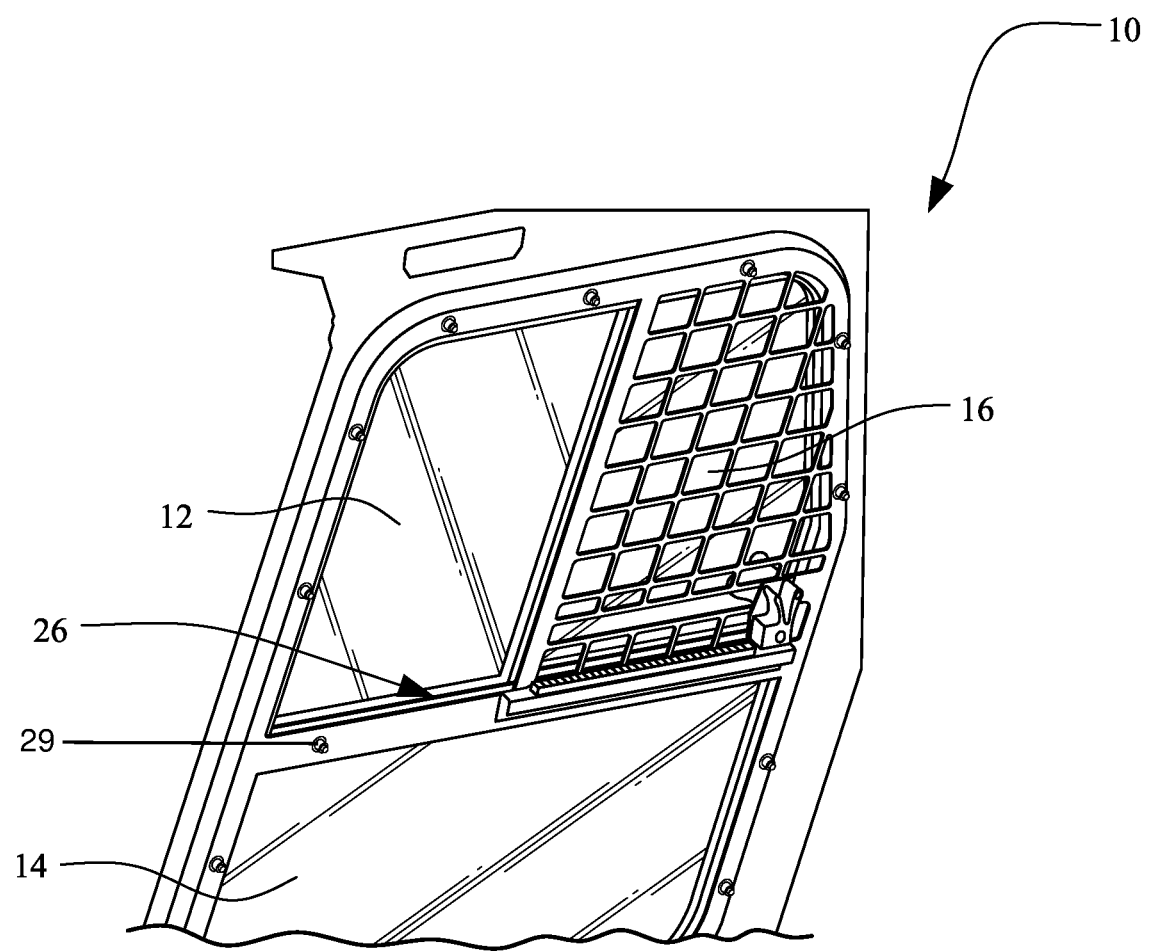
FIG. 1 is a perspective view of an exemplary window/door system including at least two window/door panels.

FIG. 1 shows an exemplary door or window system forming part of an operator protective structure on a self-propelled forestry machine or the like. The exemplary window or door system 10 shown in FIG. 1 includes an upper panel 12, a lower panel 14, and a sliding panel 16. In some embodiments only a single panel may be included, or the system 10 may only include the upper 12 and lower 14 panels.

In a preferred construction, the panels are preferably formed of polycarbonate window material, either coupled with glass in portions of it or with a polycarbonate sheet alone. In the exemplary configuration shown in FIG. 1, the sliding panel may be made of glass, while the fixed panels may be made of polycarbonate sheet. The panels 12, 14 may be coated with a hardening material such as by glazing with vinyl or bonding with adhesive. A thickness of the panels 12, 14 may be selected according to the intended use. In an exemplary construction, the panels 12, 14 are ⅜ inch polycarbonate in clear, green or other color.

Figure 2:
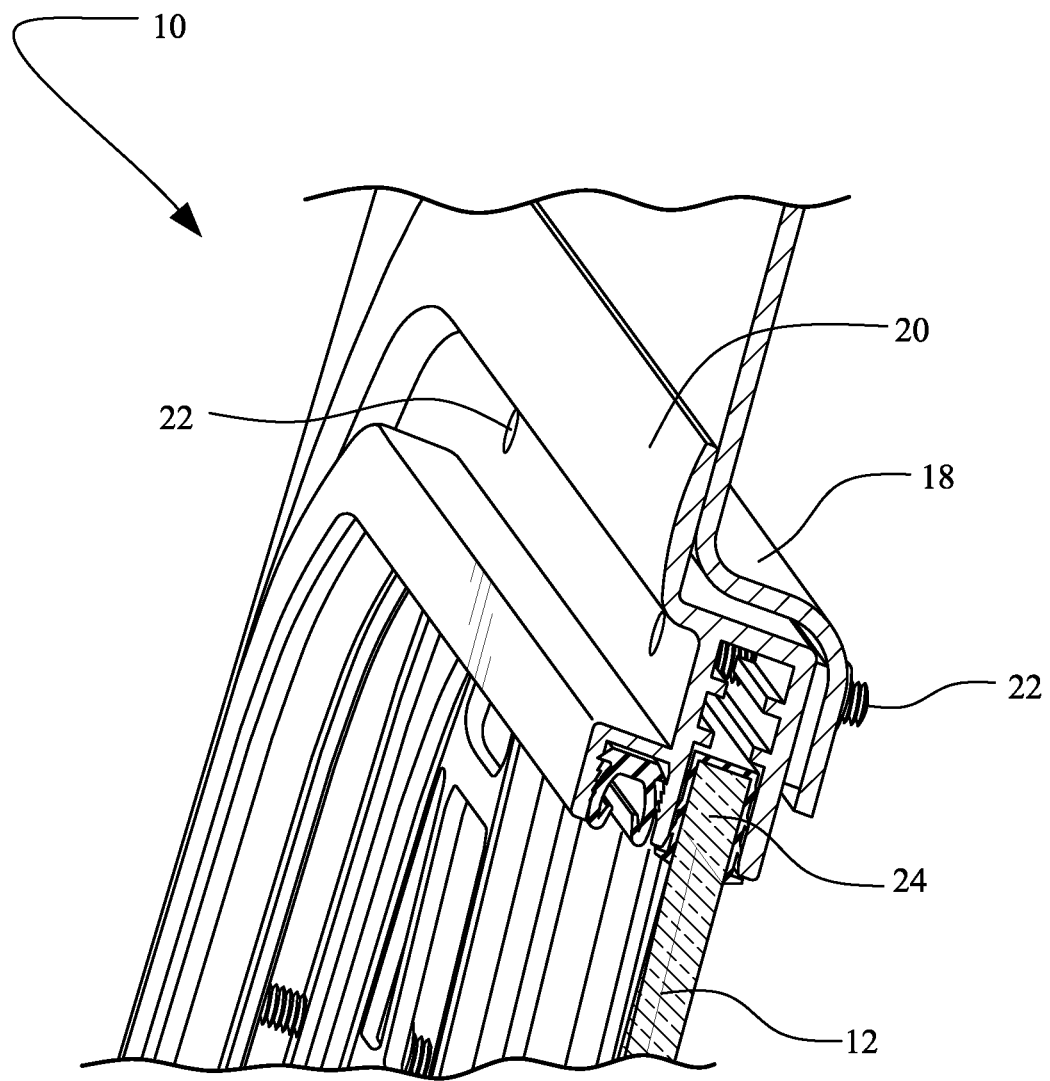
FIG. 2 is a cross-sectional view through an upper portion of the cab frame and window frame.

With reference to FIG. 2, the window or door system 10 incorporates the cab frame which includes a sidewall 18. A window/door frame 20 is bolted to the sidewall 18 via bolts or similar connectors 22. The frame 20 may be formed of aluminum, although other materials may also be suitable.

In some embodiments, the frame 20 is inverse U-shaped or O-shaped to surround/secure the panels 12, 14. The frame 20 includes at least one first channel 24 for receiving the upper panel 12. In the exemplary construction shown in FIG. 1, the O-shaped frame 20 is not necessarily circular or even rounded; rather, by describing the frame as O-shaped, the frame is provided with a closed or substantially closed periphery. As such, reference to the frame 20 being O-shaped may encompass alternative shapes with a closed or substantially closed periphery.

Figure 3:
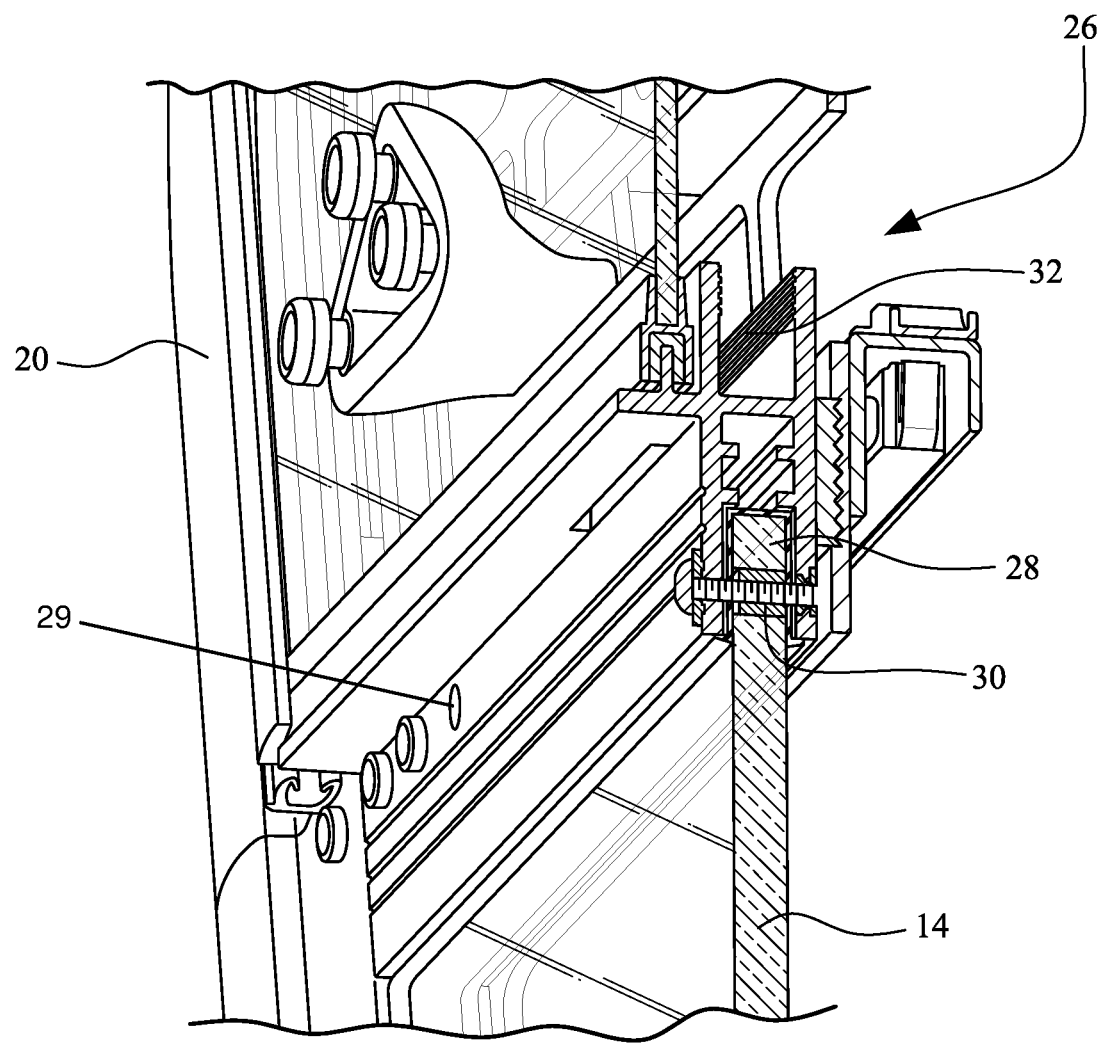
FIG. 3 is a cross-sectional view through a trim member that extends across the frame.

As shown in FIG. 3, a trim member 26 is secured to the frame 20 and extends across the U- or O-shape. The trim member 26 includes at least a second channel 28 for receiving the bottom panel 14. The trim member 26 is secured to the sidewall 18 via suitable connectors 29.

A connector 30 extends through the trim member 26 and the window or door panel 14 across the second channel 28. The fasteners 30 are thus placed through the frame and the hard-coated polycarbonate sheet simultaneously. In some embodiments, the fasteners 30 are insulated from the polycarbonate material with the use of inert materials (e.g., thermoplastic elastomers (TPE)) that are compatible with the polycarbonate material and resist time-based failures.

With the upper 12 and lower 14 panels, the trim member 26 essentially divides the frame 20 periphery into an upper section and a lower section. In this context, with continued reference to FIG. 3, the trim member 26 may include a third channel 32 that is opposite facing relative to the second channel 28. In the exemplary application shown in the drawings, the top panel 12 is supported in the third channel 32. That is, the top panel 12 is secured between the first channel 24 in the frame 20 and the third channel 32 in the trim member 26, and the bottom panel 14 is secured between the second channel 28 in the trim member and the first channel 24 in the frame 20. With this construction, a similar connector 30 may also extend through the trim member 26 and the top panel 12 across the third channel 32.

The components and reinforcing structure of the described embodiments are configured to pass the test requirements stated in ISO 8084, Machinery for Forestry—Operator Protective Structures. Of course, the construction according to the described embodiments may be applicable to other heavy equipment, UTV or other off-road vehicles that need to pass this or a similar requirement.

The hardware may also employ a latching arrangement that is provided as external hardware for the sliding panel that is easily attached to the inside of the cab during final assembly. This could potentially be used in a door or other side structure as deemed necessary to satisfy a user requirement. The latching arrangement includes a squeeze latch so that when pressure is applied, a lock bolt will lift, and the operator is able to move the sliding panel to a desired position. When the squeeze latch is released, a spring pressure urges the latch to engage in an adjacent pocket of the lower latch system. The latching arrangement is described in U.S. patent application Ser. No. 15/906,027, the contents of which are hereby incorporated by reference.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A window or door system comprising:
 a polycarbonate window or door panel;
 a sidewall;
 a frame bolted to the sidewall, the frame being inverse U-shaped or O-shaped and including a first channel for receiving the window or door panel; and
 a trim member secured to the frame and extending across the U- or O-shape, the trim member including a second channel for receiving the window or door panel, wherein the trim member includes a third channel that is aligned with and opposite facing relative to the second channel, and wherein the window or door panel comprises a top panel secured between the first channel in the frame and the second channel in the trim member and a bottom panel secured between the third channel in the trim member and the first channel in the frame, wherein a connector extends through the trim member and the window or door panel across the second channel.

2. A window or door system according to claim 1, wherein the polycarbonate window or door panel is coated with a hardening material.

3. A window or door system according to claim 1, wherein the connector is formed of an inert material.

4. A window or door system according to claim 1, wherein the frame is O-shaped.

5. A window or door system according to claim 1, wherein the connector comprises a first connector extending through the trim member and the top panel across the second channel and a second connector extending through the trim member and the bottom panel across the third channel.

6. A window or door system according to claim 1, wherein the polycarbonate window or door panel is coupled with glass.

7. A window or door system according to claim 1, wherein the polycarbonate window or door panel is has a thickness of ⅜".

8. A window or door system according to claim 1, wherein the system is configured to pass test requirements in ISO 8084, Machinery for Forestry—Operator Protective Structures.

9. A window or door system comprising:
 a window or door panel;
 a sidewall;
 a frame secured to the sidewall, the frame being inverse U-shaped or O-shaped and including a first channel for receiving the window or door panel; and
 a trim member secured to the frame and the sidewall and extending across the U- or O-shape, the trim member including a second channel for receiving the window or door panel, wherein the trim member includes a third channel that is opposite facing relative to the second channel, and wherein the window or door panel comprises a top panel secured between the first channel in the frame and the second channel in the trim member and a bottom panel secured between the third channel in the trim member and the first channel in the frame, wherein the system is configured to pass test requirements in ISO 8084, Machinery for Forestry—Operator Protective Structures.

10. A window or door system according to claim 9, wherein a connector extends through the trim member and the window or door panel across the second channel.

11. A window or door frame according to claim 9, wherein the frame is bolted to the sidewall.

12. A window or door frame according to claim 9, wherein the frame is 0-shaped, wherein the trim member includes a third channel that is opposite facing relative to the second channel, and wherein the window or door panel comprises a top panel secured between the first channel in the frame and the second channel in the trim member and a bottom panel secured between the third channel in the trim member and the first channel in the frame.

13. A window or door system according to claim 12, wherein the connector comprises a first connector extending through the trim member and the top panel across the second channel and a second connector extending through the trim member and the bottom panel across the third channel.

14. A window or door system according to claim 9, wherein the polycarbonate window or door panel is has a thickness of ⅜".

\* \* \* \* \*